United States Patent Office 3,290,584
Patented Dec. 6, 1966

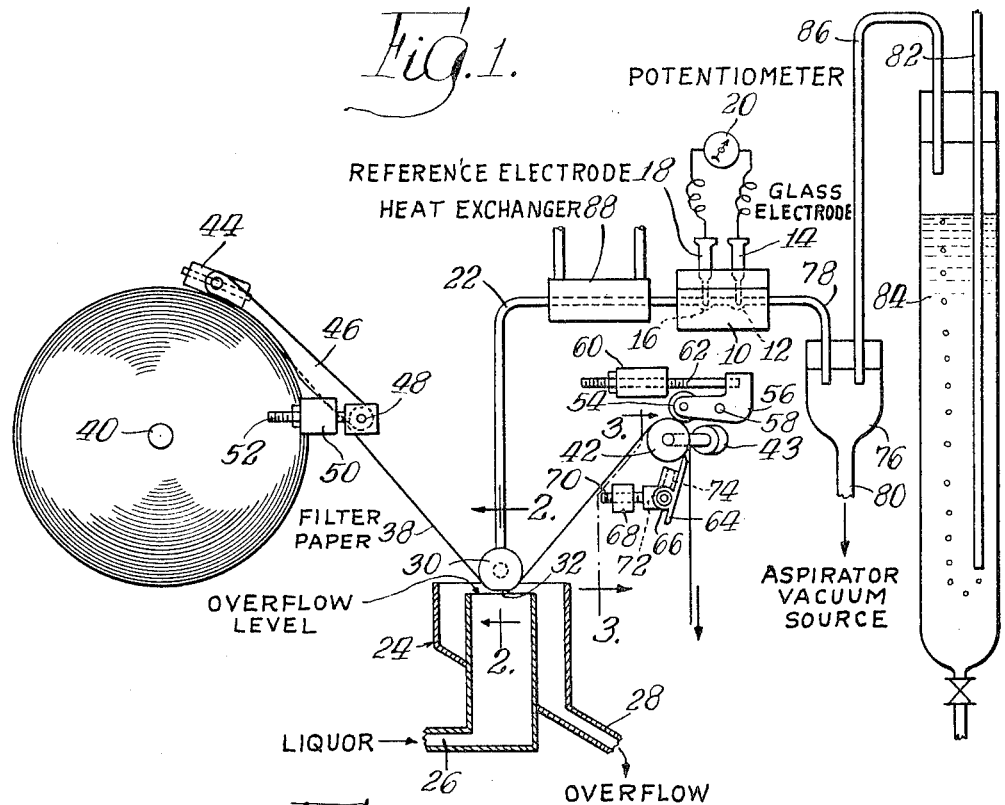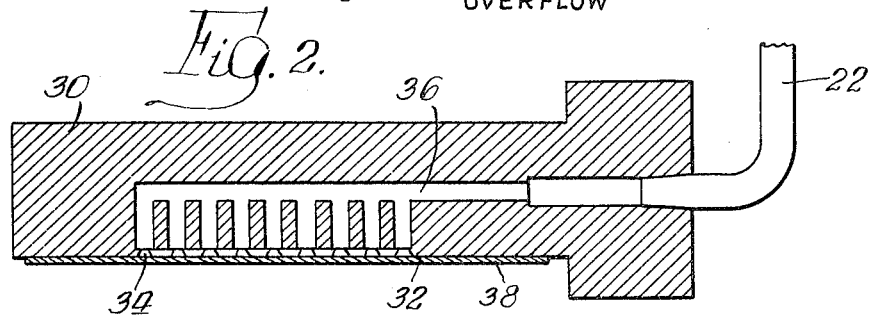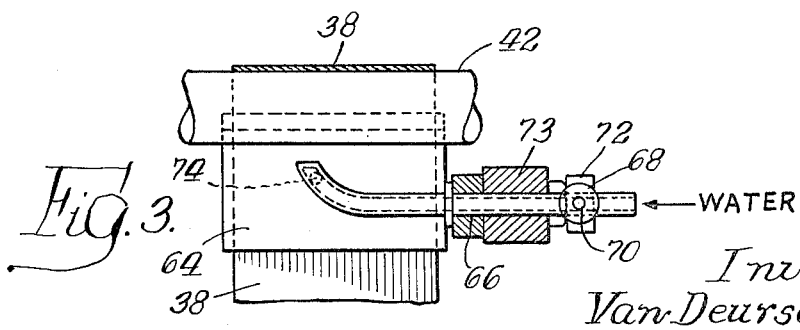

3,290,584
APPARATUS FOR PREVENTING FOULING OF pH METER ELECTRODES WITH FILTER ELEMENT TRANSPORTING MEANS
Van Deursen Harms, Homewood, and Joe S. Johnson, Worth, Ill., assignors to Corn Products Company, New York, N.Y., a corporation of Delaware
Filed May 13, 1966, Ser. No. 550,016
5 Claims. (Cl. 324—30)

This application is a continuation-in-part of our application, Serial No. 198,011, filed May 28, 1962, now abandoned.

This invention relates to apparatus for measuring the hydrogen ion concentration or pH of a solution or other liquor. Although not limited thereto the invention has particular application to apparatus or method where pH measurements of the solution are to be taken continuously, or on a semi-continuous basis.

Although several methods and apparatus are known by which the pH of a given liquor may be checked, one that is particularly adapted for industrial processes or systems requiring an automatic control of the pH embodies the principles of a galvanic cell and for which purposes utilizes a glass electrode and a reference electrode. The two electrodes are conventionally immersed in a tank or channel of the liquor or in a bypass pipe through which a continuous sample of the stream is pumped. A potentiometer or other electrical unit measuring device is connected between the two electrodes and the potentiometer is set so that it will balance at a pre-determined pH reading. A difference between the pH in the liquor surrounding the electrodes and the pH setting of the meter will produce an unbalanced voltage in the potentiometer circuit. This is utilized to energize a relay circuit to operate a motor which opens a valve associated therewith to permit a flow of corrective reagent or other material into the solution whenever and as long as the potentiometer indicates an out of balance condition.

One of the limitations of such a control device is the susceptibility of their measuring electrodes to fouling. Thus where such a device is being used to control the pH of liquors containing a quantity of proteins, hydrophobic colloids or the like, these materials will adhere to the surface of the glass electrode and erroneous reading will result. An example of such a liquor is the syrup leaving the converters in the acid hydrolysis of corn starch. This syrup contains a fatty, proteinaceous material which clings tenaciously to the electrodes (or to anything else with which it comes in contact) and renders them insensitive to pH changes. The fouling of the electrodes in such liquors has been found to occur so rapidly that reliable continuous or semi-continuous pH measurements are impractical. At the same time it was recognized that considerable savings in labor could be effected if the acid hydrolyzate were to be neutralized automatically.

Thus, a first and principal object of the present invention is to provide novel and improved means which will be effective to inhibit fouling of the electrodes so as to permit reliable continuous or semi-continuous pH measurements of liquors without regard to their fatty or other proteinaceous material content.

Various schemes have been tried in an effort to prevent fouling of the pH electrodes. For example, it has been proposed to provide a scrubbing or wiping mechanism which would remove the accumulation as it is collected on the electrodes. The mechanisms tried, however, proved to be ineffective. Attempts were also made at cleaning the electrodes by high-flow velocities, ultrasonic cleaning, and also by periodically cleaning with steam, but all without success.

In accordance with the present invention, however, it was recognized that a solution to this stubborn problem lay in inhibiting the flow of the fatty, proteinaceous or other adherent material to the chamber which contains the electrodes of the pH meter. To clarify any substantial portion of the process stream would not only be costly but in some instances would have a detrimental effect on the process itself.

Thus a further and more specific object of the invention is to provide means by which only the small portion of the liquor required to be supplied to the electrodes to effect the pH check and/or control be freed of the fatty, proteinaceous or other material of the liquor which would cling to the electrodes so as to detrimentally affect their sensitivity to changes in the pH value.

To merely locate a filter over the entrance to the electrode chamber which would screen out the undesired fatty or other content of the sample of the liquor directed to the electrode is not satisfactory. If the filter is large enough to avoid unduly frequent changes or cleaning of the filter medium, then the large liquid capacity introduces an undesirable time lag in the measurements.

It is therefore a further object and/or feature of the present invention to provide a continuously renewed or changing filter medium whereby only a minimum filtered sample need be directed to the electrodes of the pH measuring device.

This is accomplished in accordance with the invention by relying upon capillary tubing to supply a sample of the process liquor into the electrodes chamber of the pH measuring device and to provide a roll of filter paper from which a portion may be slowly drawn across the entrant end of the capillary tubing. In this way a constantly fresh filter is provided to clarify the sample of the liquor fed to the pH measuring electrodes. There is no problem of fatty, proteinaceous or other material clogging the filter element to interrupt the flow of the filtered sample to the electrodes and at the same time only the filtered sample and in only the small amount required reaches the electrodes. Therefore the meter remains continuously sensitive to pH changes in the solution liquor.

Further features of the invention include the use of an overflow chamber connected with the process stream, the overflow level of which is adjusted so that the surface of the liquor just touches the filter paper and in which chamber the rate of flow is regulated so that the liquor from the process stream is supplied thereto at a rate considerably in excess of the rate at which the sample is withdrawn therefrom to the electrodes chamber. The excess liquor overflows and returns to the process or supply tank carrying with it the floating lumps of fatty, proteinaceous and insoluble materials so that the system is essentially non-clogging.

Still other features of the invention include an arrangement for conveniently adjusting the rate at which the sample is withdrawn from the overflow chamber, through the continuously changing filter and into the electrode chamber, so as to minimize breaking of the filter paper.

The invention also provides adjustable means for applying the proper tension on the filter paper feed means so as to prevent slippage of the filter paper.

Still another feature of the invention is the provision of appropriate means for cooling the filtered sample to a satisfactory temperature before it contacts the electrodes. This helps to maximize the life of the electrodes.

Many other objects as well as features and advantages of the invention will be at once apparent or will become so from the detailed description of a preferred embodiment of the invention which follows.

Referring therefore to the drawing:

FIGURE 1 is a schematic view which illustrates a preferred embodiment of the invention;

FIGURE 2 is a sectional view through the filter element taken along lines 2—2 of FIGURE 1; and FIGURE 3 is an enlarged view taken along lines 3—3 of FIGURE 1 to illustrate how a small trickle of water may be introduced through the scraper used to clean the drive roll to prevent the used filter paper from clinging to the scraper.

Referring now more particularly to the several views wherein like parts are identified by like reference numerals, and first to FIGURE 1, 10 represents the electrodes chamber of a pH meter having a well at 12 which receives the glass electrode 14 and a well 16 which receives the reference electrode 18 of a conventional pH meter. Although the construction of the two electrodes and the electrical circuitry of the pH meter are conventional and therefore do not represent the inventive contribution, it may be helpful to explain that in one form of such meters the glass electrode will comprise a thin wall glass tube containing an inner solution such as citrate buffered chloride solution in which an electrode such as a silver-silver chloride filament is immersed. The reference electrode 18 preferably will be of the type referred to as a calomel electrode, and consists of a cylindrical tube containing mercury in contact with saturated mercurous chloride in the presence of an undissolved amount of mercurous chloride and a large excess of potassium chloride solution. Twenty represents a potentiometer or other instrument used to measure the potential difference that exists between the two electrodes, it being also understood that the potential developed across the thin glass wall of the glass electrode is proportional to the difference in hydrogen ion concentration which exists between the inner liquid within the bulb and the liquid in well 12 which surrounds it. Conventionally potentiometer 20 is set to balance at a desired pH reading and any difference that exists between the pH of the solution in wells 12 and 16 surrounding the electrodes and the pH setting of the meter 20 produces an unbalanced voltage in the circuit. Potentiometer 20 may be set so that the pH values may be read from a provided scale. Preferably, however, it is arranged so as to operate a relay which in turn operates a motor-driven valve in a feed line to regulate feeding of a particular ingredient or ingredients to the solution under process.

Twenty-two represents the capillary tubing by which the wells of the electrode chamber communicate with tht overflow chamber which is indicated at 24. Said overflow chamber has an inlet at 26 which receives the incoming liquor from a tank or channel comprising the system or a bypass thereof and has an outlet at 28 through which the overflow is returned to the said bypass line, tank or channel of the system. Thirty represents a stationary filter element which is attached to the entrant end of tubing 22. Element 30 may be of stainless steel or other appropriate material and has a face 32 on its underside which is slotted to provide a plurality of ports 34 (FIGURE 2) which communicate through 36 with the capillary tubing 22. The height of the liquor level in overflow chamber 24 is so adjusted that the stationary filter element 30 is immediately adjacent the overflow level of the liquor in the chamber 24 and so that the filter paper 38 just touches the surface of the liquor.

Filter paper 38 is preferably provided in roll form rotatably mounted on an appropriate support 40 to one side of element 30 from which it is unwound and slowly drawn across the ported underside of the stationary filter element 30 by means of revolving drive roller 42, roller 42 being driven by a motor 43. Although any appropriate material may be used as the filter medium, the inventors have found that a chromatographic paper such as is available from E. H. Sargent and Company, under the title Whatman No. 4, Catalog No. S-18871, is very satisfactory for their purposes. Rolls of this paper are available in 600 foot lengths, 1½ wide. As the filter paper 38 is slowly drawn across the ports 34 in the underside of the filter element 30, a constantly fresh section or renewed filter is provided which clarifies the sample as it is withdrawn from the overflow chamber 24 to the electrodes chamber 10. Suitable tension can be maintained on the paper by means of a small weight which drags on the paper roll. Such a weight is indicated at 44 pivotally supported between the free ends of a pair of arms 46 located to either side of the unrolling paper strip, the arms being mounted to pivot about pintle means 48. The pressure which weight 44 exerts on the paper as it unrolls can be varied by adjusting the position of counterweight 50 on arm 52 to which it is threadedly connected, arm 52 being rigidly connected with arms 46 so as to pivot therewith about means 48. It will be understood that arm 52 will be so bent or angled as to clear the roll and paper tape 38 leading therefrom to element 30.

A pair of idler rolls 54 are also provided in associating with the drive roller 42, one adjacent each edge of the paper. These are mounted on a suitable supporting structure 56 pivoted as at 58 and their pressure on the paper and against roller 42 counterbalanced by weights 60 which are adjustable on threaded member 62. By varying the position of the counterweights 60 on members 62 proper tracking of the paper can be maintained and so that the paper does not slip as the drive roller 42 is turned. A scraper is also provided at 64 which serves to clean the drive roller 42 of any solids which it picks up from the filter paper 38. For this purpose, it is illustrated as mounted on a hollow shaft 66 which is rotatably mounted in a bearing 73 and pressure of the scraper edge on the drive roller 40 is adjustable by moving counterweight 68 along arm 70 to which it is threadedly connected. As is apparent from FIGURE 1, arm 70 is also suitably angled so that its counterweight 68 may be located to one side of the filter paper 38. In order to prevent the filter paper from clining to the scraper 64, as it is moved off the roll to the waste collection area, a small trickle of water may be introduced through the hollow shaft 66. For this purpose shaft 66 comprises a hollow piece of tubing having one end plugged and soldered to the rear side of the scraper. This end is provided with a small opening 74 which is aligned with a similar opening through the scraper. The other end of the tubing shaft 66 is connected to a source of water.

To effect a continuous withdrawal of a sample of liquor from the overflow chamber 24 through the filter paper 38, element 30 and the capillary tubing 22 into chamber 10 of the pH meter, means are provided at 76 which may comprise a stoppered funnel-shaped connector joined by appropriate tubing 78 to the opposite side of the electrodes chamber 10 and connected at 80 to an aspirator vacuum source (not shown). As previously mentioned, capillary tubing is utilized as the conduit 22 to minimize sample retention time in the system. In order to minimize breakage of the paper, the evacuating force used to withdraw the continuous sample through the filter paper from the overflow chamber can be controlled by air bleeding through a bubble tube 82 whenever the suction of the aspirator exceeds the submergence of said tube 82 in a liquid communicating cylinder 84 with which member 76 also has communication as through tubing 86. The capillary tubing 22 is also passed through a heat exchanger 88 through which cooling water or other fluid is circulated so that the filtered sample is cooled to the operating range of the electrodes before it is passed into the electrodes chamber 10.

From the aforesaid description it will be apparent that all of the objects, advantages and features recited for the invention can be obtained in a simple and convenient, yet entirely practical manner.

Although the invention has thus far been described as applicable to prevent the fouling of the electrodes of glass-electrode type pH meter, it will be recognized that with slight modifications the invention will also have utility in other devices used for measuring the pH value or other quality of a solution liquor and where it is important to avoid clogging or contamination of the testing chamber, materials and/or components thereof. For example, the invention conceivably would be useful to filter a continuous sample of liquor being supplied to the testing chamber of a device utilizing a colormetric principle of measuring pH.

It will be further understood that the aforesaid description is not to be taken in a limiting sense, but merely as illustrative of one embodiment the invention may take. Therefore it will be understood that many changes as well as variations in the steps of the process and parts of the apparatus may be made as are in keeping with the broad principles of the invention as described and as are set forth in the appended claims.

We claim:

1. Apparatus for supplying filtered liquid to a pH measurement cell that has at least two electrodes therein for projection into the filtered liquid within the cell, for measuring the pH thereof, comprising:

means providing a flowing supply of liquid to be sampled, with an exposed upper surface from which a sample can be drawn;

a sampling head that is formed with a face that confronts said liquid surface and that is formed with at least one opening through which liquid can be drawn into said head;

conduit means interconnecting and communicating with the opening in said liquid sampling head and said cell;

an elongate filter element, a part of which is interposed between the sampling head, over said opening, and the upper surface of the liquid, in contact with said liquid surface, said filter element being resistant to the liquor being filtered and of a material which will not alter the character of the filtrate;

means for effecting the continuous transport of said element across said opening during operation of said apparatus, thereby to present a continuously renewed fresh portion of the filter element to the liquid, and means for continuously effecting transport of said liquid through said filter element, opening, conduit means, and cell, to permit continuous pH measurements to be made.

2. Apparatus in accordance with claim 1 wherein said conduit means comprises capillary tubing.

3. Apparatus in accordance with claim 1 wherein said filter element is a ribbon of filter paper.

4. Apparatus in accordance with claim 1 wherein said means providing a flowing supply of liquid to be sampled comprises an open tank that has an upper rim over which the liquid can overflow.

5. Apparatus in accordance with claim 1 including heat exchange means communicating with said conduit means and interposed therein between said sampling head and said cell.

No references cited.

RUDOLPH V. ROLINEC, *Primary Examiner.*

CHARLES F. ROBERTS, *Examiner.*